(12) United States Patent
Bernhart

(10) Patent No.: US 11,194,398 B2
(45) Date of Patent: Dec. 7, 2021

(54) TECHNOLOGIES FOR ADAPTIVE RENDERING USING 3D SENSORS

(71) Applicant: Intel Corporation, Santa Clara, CA (US)

(72) Inventor: Bryan G. Bernhart, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 915 days.

(21) Appl. No.: 14/866,894

(22) Filed: Sep. 26, 2015

(65) Prior Publication Data

US 2017/0090585 A1    Mar. 30, 2017

(51) Int. Cl.
| | |
|---|---|
| G06F 3/00 | (2006.01) |
| G06F 3/01 | (2006.01) |
| G06F 3/03 | (2006.01) |
| G06F 3/0485 | (2013.01) |

(52) U.S. Cl.
CPC .............. *G06F 3/017* (2013.01); *G06F 3/005* (2013.01); *G06F 3/013* (2013.01); *G06F 3/0304* (2013.01); *G06F 3/0485* (2013.01)

(58) Field of Classification Search
CPC .... G06F 3/04815; G06F 3/0485; G06F 3/017; G06F 3/005; G06F 3/013; G06F 3/0304
See application file for complete search history.

(56) References Cited

U.S. PATENT DOCUMENTS

| | | | | |
|---|---|---|---|---|
| 6,657,647 B1 * | 12/2003 | Bright | ................ | H04L 29/0809 715/856 |
| 7,386,799 B1 * | 6/2008 | Clanton | .................. | A63F 13/12 715/753 |
| 7,559,034 B1 * | 7/2009 | Paperny | ............... | G06F 9/44526 345/629 |
| 7,725,547 B2 * | 5/2010 | Albertson | ............... | G06F 3/016 382/107 |
| 7,971,156 B2 * | 6/2011 | Albertson | ............... | G06F 21/35 715/863 |
| 8,566,696 B1 * | 10/2013 | Hamon | ................. | G06F 16/957 715/205 |

(Continued)

FOREIGN PATENT DOCUMENTS

| | | |
|---|---|---|
| EP | 2518586 | 10/2012 |
| EP | 3285133 | 2/2018 |

(Continued)

OTHER PUBLICATIONS

International Search Report for PCT/US16/048953, dated Nov. 23, 2016 (3 pages).

(Continued)

*Primary Examiner* — Tadesse Hailu
*Assistant Examiner* — Andrew Chung
(74) *Attorney, Agent, or Firm* — Hanley, Flight & Zimmerman, LLC

(57) ABSTRACT

Technologies for adaptively rendering content on a computing device are disclosed. Such technologies include analyzing 3D images to detect a gesture performed by a user and modifying a rendering, pre-fetching, or pre-navigation operation of the computing device based on the detected gesture. Such user gestures may be static or dynamic and may cause the computing device to retrieve additional content, zoom content, halt or reduce rendering of content, and/or perform other operations and functions related to the rendering of content.

9 Claims, 3 Drawing Sheets

(56) References Cited

U.S. PATENT DOCUMENTS

| | | | |
|---|---|---|---|
| 8,717,318 B2 | 5/2014 | Anderson et al. | |
| 8,954,884 B1* | 2/2015 | Barger | G06F 3/0485 |
| | | | 715/792 |
| 8,994,847 B2 | 3/2015 | Chen et al. | |
| 9,268,434 B2 | 2/2016 | Sultenfuss et al. | |
| 9,721,383 B1* | 8/2017 | Horowitz | G06T 17/20 |
| 9,740,290 B2 | 8/2017 | Rosenberg et al. | |
| 9,785,234 B2 | 10/2017 | Horesh | |
| 9,996,638 B1* | 6/2018 | Holz | G06F 17/5009 |
| 10,027,662 B1 | 7/2018 | Mutagi et al. | |
| 10,101,817 B2 | 10/2018 | Hsin et al. | |
| 10,254,178 B2 | 4/2019 | Carbone et al. | |
| 10,262,599 B2 | 4/2019 | Lang et al. | |
| 10,620,786 B2 | 4/2020 | Veeramani et al. | |
| 10,740,912 B2 | 8/2020 | Ren et al. | |
| 10,819,920 B1 | 10/2020 | Hamlin et al. | |
| 2002/0091738 A1* | 7/2002 | Rohrabaugh | G06F 3/0488 |
| | | | 715/249 |
| 2003/0043174 A1* | 3/2003 | Hinckley | G06F 3/03547 |
| | | | 345/684 |
| 2003/0174149 A1* | 9/2003 | Fujisaki | G06F 3/0485 |
| | | | 345/684 |
| 2004/0175020 A1 | 9/2004 | Bradski et al. | |
| 2005/0071698 A1 | 3/2005 | Kangas | |
| 2006/0192775 A1 | 8/2006 | Nicholson et al. | |
| 2008/0046425 A1* | 2/2008 | Perski | G06F 3/04883 |
| 2008/0158144 A1* | 7/2008 | Schobben | G06F 1/3203 |
| | | | 345/156 |
| 2008/0301300 A1* | 12/2008 | Toub | H04L 67/06 |
| | | | 709/227 |
| 2010/0281432 A1* | 11/2010 | Geisner | G06F 3/011 |
| | | | 715/849 |
| 2011/0055752 A1* | 3/2011 | Rubinstein | G06F 3/0485 |
| | | | 715/784 |
| 2011/0154266 A1* | 6/2011 | Friend | A63F 13/06 |
| | | | 715/863 |
| 2011/0175932 A1* | 7/2011 | Yu | G06F 3/013 |
| | | | 345/661 |
| 2011/0248918 A1* | 10/2011 | Yoo | G06F 3/011 |
| | | | 345/157 |
| 2011/0252339 A1* | 10/2011 | Lemonik | G06F 40/166 |
| | | | 715/753 |
| 2011/0296163 A1 | 12/2011 | Abernethy et al. | |
| 2011/0298702 A1 | 12/2011 | Sakata et al. | |
| 2011/0298967 A1 | 12/2011 | Clavin et al. | |
| 2012/0054670 A1* | 3/2012 | Rainisto | G06F 3/0485 |
| | | | 715/784 |
| 2012/0062470 A1 | 3/2012 | Chang | |
| 2012/0300061 A1* | 11/2012 | Osman | G06F 1/3231 |
| | | | 348/135 |
| 2012/0319997 A1* | 12/2012 | Majumder | H04N 9/3147 |
| | | | 345/175 |
| 2013/0007590 A1* | 1/2013 | Rivera | G06F 3/0481 |
| | | | 715/234 |
| 2013/0120460 A1* | 5/2013 | Adams | G06F 3/0485 |
| | | | 345/660 |
| 2013/0174016 A1* | 7/2013 | Glazer | G06F 16/9574 |
| | | | 715/234 |
| 2013/0185633 A1* | 7/2013 | Bunker | G06F 40/106 |
| | | | 715/246 |
| 2013/0207895 A1* | 8/2013 | Lee | G06F 3/012 |
| | | | 345/158 |
| 2013/0212462 A1* | 8/2013 | Athas | G06F 16/9577 |
| | | | 715/234 |
| 2013/0222329 A1* | 8/2013 | Larsby | G06F 3/04883 |
| | | | 345/174 |
| 2013/0283213 A1* | 10/2013 | Guendelman | G06F 3/017 |
| | | | 715/848 |
| 2013/0321265 A1 | 12/2013 | Bychkov et al. | |
| 2013/0321271 A1 | 12/2013 | Bychkov et al. | |
| 2014/0006830 A1 | 1/2014 | Kamhi et al. | |
| 2014/0028548 A1 | 1/2014 | Bychkov et al. | |
| 2014/0085451 A1 | 3/2014 | Kamimura et al. | |
| 2014/0089865 A1* | 3/2014 | Gay | G06F 3/04883 |
| | | | 715/863 |
| 2014/0129937 A1* | 5/2014 | Jarvinen | G06F 3/0487 |
| | | | 715/716 |
| 2014/0139456 A1* | 5/2014 | Wigdor | G06F 3/0416 |
| | | | 345/173 |
| 2014/0149935 A1* | 5/2014 | Johnson | G06F 3/0482 |
| | | | 715/811 |
| 2014/0189579 A1* | 7/2014 | Rimon | G06F 3/0485 |
| | | | 715/784 |
| 2014/0191995 A1 | 7/2014 | Karpin et al. | |
| 2014/0201690 A1* | 7/2014 | Holz | G06F 3/017 |
| | | | 715/863 |
| 2014/0208260 A1* | 7/2014 | Kawahara | G06F 3/04845 |
| | | | 715/784 |
| 2014/0258942 A1* | 9/2014 | Kutliroff | G06F 3/013 |
| | | | 715/863 |
| 2014/0267021 A1* | 9/2014 | Lee | G06F 3/013 |
| | | | 345/156 |
| 2014/0281918 A1* | 9/2014 | Wei | H04L 67/02 |
| | | | 715/234 |
| 2014/0361977 A1 | 12/2014 | Stafford et al. | |
| 2014/0372511 A1 | 12/2014 | Kapadia et al. | |
| 2015/0009238 A1 | 1/2015 | Kudalkar | |
| 2015/0015688 A1 | 1/2015 | Yang | |
| 2015/0100884 A1* | 4/2015 | Ryu | G09G 5/397 |
| | | | 715/719 |
| 2015/0121193 A1* | 4/2015 | Beveridge | G06F 40/14 |
| | | | 715/234 |
| 2015/0121287 A1* | 4/2015 | Fermon | G06F 3/016 |
| | | | 715/773 |
| 2015/0177843 A1* | 6/2015 | Kwon | G06F 3/017 |
| | | | 715/863 |
| 2015/0185909 A1 | 7/2015 | Gecnuk | |
| 2015/0193395 A1* | 7/2015 | Nicolaou | G06F 17/3053 |
| | | | 707/726 |
| 2015/0220149 A1* | 8/2015 | Plagemann | G06F 3/017 |
| | | | 715/856 |
| 2015/0220150 A1* | 8/2015 | Plagemann | G06F 3/017 |
| | | | 715/856 |
| 2015/0248167 A1* | 9/2015 | Turbell | G06F 3/017 |
| | | | 715/754 |
| 2015/0264572 A1* | 9/2015 | Turgeman | H04W 12/06 |
| | | | 455/411 |
| 2015/0360567 A1* | 12/2015 | Sannomiya | B60K 35/00 |
| | | | 345/174 |
| 2015/0363070 A1* | 12/2015 | Katz | G06F 3/017 |
| | | | 715/852 |
| 2016/0062584 A1* | 3/2016 | Cohen | G06F 3/0485 |
| | | | 715/784 |
| 2016/0109961 A1* | 4/2016 | Parshionikar | G06F 3/013 |
| | | | 345/156 |
| 2016/0116960 A1 | 4/2016 | Kwak et al. | |
| 2016/0170617 A1* | 6/2016 | Shi | G06F 3/0484 |
| | | | 345/668 |
| 2016/0179767 A1* | 6/2016 | Mavinakuli | G06F 9/451 |
| | | | 715/760 |
| 2016/0180762 A1* | 6/2016 | Bathiche | G06F 3/013 |
| | | | 345/174 |
| 2016/0187994 A1 | 6/2016 | La et al. | |
| 2016/0212317 A1 | 7/2016 | Alameh et al. | |
| 2016/0232701 A1* | 8/2016 | Drozdyuk | G06F 3/14 |
| 2016/0259467 A1 | 9/2016 | Nayyar et al. | |
| 2016/0297362 A1* | 10/2016 | Tijerina | H04N 7/181 |
| 2016/0370860 A1 | 12/2016 | Bychkov et al. | |
| 2017/0039170 A1* | 2/2017 | Tunali | G06F 3/04845 |
| 2017/0085790 A1* | 3/2017 | Bohn | H04N 5/23235 |
| 2017/0147879 A1 | 5/2017 | Alameh et al. | |
| 2017/0201254 A1 | 7/2017 | Hanssen et al. | |
| 2017/0269725 A1 | 9/2017 | Kang | |
| 2017/0321856 A1 | 11/2017 | Keates | |
| 2018/0039410 A1 | 2/2018 | Kim et al. | |
| 2018/0039990 A1 | 2/2018 | Lindemann | |
| 2018/0136719 A1 | 5/2018 | Chen | |
| 2018/0164942 A1 | 6/2018 | Huffman et al. | |
| 2018/0188774 A1 | 7/2018 | Ent et al. | |
| 2018/0189547 A1 | 7/2018 | Daniels et al. | |

(56) References Cited

U.S. PATENT DOCUMENTS

| | | | |
|---|---|---|---|
| 2018/0224871 A1 | 8/2018 | Sahu et al. | |
| 2018/0321731 A1 | 11/2018 | Alfano et al. | |
| 2019/0034609 A1 | 1/2019 | Yang et al. | |
| 2019/0079572 A1 | 3/2019 | Yamamoto | |
| 2019/0174419 A1 | 6/2019 | Schillings et al. | |
| 2019/0265831 A1 | 8/2019 | Sinnott et al. | |
| 2019/0278339 A1 | 9/2019 | Cooper et al. | |
| 2019/0361501 A1 | 11/2019 | Park et al. | |
| 2019/0371326 A1 | 12/2019 | Bocklet et al. | |
| 2020/0012331 A1 | 1/2020 | de Cesare et al. | |
| 2020/0026342 A1 | 1/2020 | Sengupta et al. | |
| 2020/0125158 A1 | 4/2020 | Giusti et al. | |
| 2020/0133358 A1 | 4/2020 | Mishra et al. | |
| 2020/0133374 A1 | 4/2020 | Sinha et al. | |
| 2020/0134151 A1 | 4/2020 | Magi et al. | |
| 2020/0348745 A1 | 11/2020 | Hamlin et al. | |

FOREIGN PATENT DOCUMENTS

| | | |
|---|---|---|
| KR | 20180029370 | 3/2018 |
| WO | 2010071631 | 6/2010 |
| WO | 2014-131188 | 9/2014 |
| WO | 2014205227 | 12/2014 |
| WO | 2020191643 | 10/2020 |

OTHER PUBLICATIONS

Written Opinion for PCT/US16/048953, dated Nov. 23, 2016 (9 pages).

European Patent Office, "Extended European Search Report," issued in connection with European Patent Application No. 20197337.7, dated Mar. 9, 2021, 11 pages.

European Patent Office, "Invitation pursuant to Rule 62a(1)," issued in connection with European Patent Application No. 20197335.1, dated Mar. 17, 2021, 2 pages.

Reads, "Microsoft Windows Vista SideShow—In-Depth (pics)", Notebook Review, Jan. 11, 2006, available at www.notebookreview.com/news/microsoft-windows-vista-sideshow-in-depth-pics/ (retrieved May 6, 2019), 7 pages.

NVIDIA, "NVIDIA® Preface™ Platform Enables Windows Vista on the Go," Jan. 8, 2007, available at https://www.nvidia.com/object/IO_38775.html (retrieved May 6, 2019), 5 pages.

NVIDIA, "NVIDIA and Asus Deliver World's First Notebook with Windows Sideshow Secondary Display," Jan. 8, 2007, available at https://www.nvidia.com/object/IO_38772.html (retrieved May 6, 2019), 5 pages.

Notebook Review, "CES 2007: Vista SideShow in HP, Fujitsu, LG and Asus Notebooks,"Jan. 8, 2007, available at www.notebookreview.com/news/ces-2007-vista-sideshow-in-hp-fujitsu-lg-and-asus-notebooks/ (retrieved May 6, 2019), 8 pages.

NVIDIA, "PDK User's Guide: Preface Personal Media Device," Sep. 4, 2007, 39 pages.

Gajitz, "Open Sesame! Gesture-Controlled Motorized Laptop Lid", Sep. 2012, available at https://gajitz.com/open-sesame-gesture-controlled-motorized-laptop-lid/ (retrieved May 6, 2019), 3 pages.

Purcher, "Google Patents a Motorized Pixelbook Lid that Opens and Closes with a Simple Touch & Auto-Aligns the Display to the user's Face", Patently Mobile, Nov. 25, 2017, available at https://www.patentlymobile.com/2017/11/google-patents-a-motorized-pixelbook-lid-that-opens-and-closes-with-a-simple-touch-auto-aligns-the-display-to-the-users-fa.html (retrieved May 5, 2019), 6 pages.

Indiegogo, "Cosmo Communicator", 2018, available at https://www.indiegogo.com/projects/cosmo-conununicator#/ (retrieved May 6, 2019), 18 pages.

Cutress, "Asus ZenBook Pro 15(UX580): A 5.5-inch Screen in the Touchpad", AnandTech, Jun. 5, 2018, available at https://www.anandtech.com/show/12880/asus-zenbook-pro-15-ux580-a-55inch-screen-in-the-touchpad (retrieved Dec. 18, 2018), 5 pages.

Chin, "Alexa on Windows 10 Hands-On: Useful, with 1 Big Catch", Laptop Magazine, Nov. 14, 2018, available at https://www.laptopmag.com/articles/alexa-windows-10-hands-on (retrieved May 6, 2019), 6 pages.

Bushan, "CES 2019: Dell's new laptop can sense your presence and wake itself," Hindustan Tunes, Jan. 5, 2019, available at https://www.hindustantimes.com/tech/ces-2019-dell-latitude-7400-2-in-1-laptop-launched-price-specifications-features/story-CiRoU1GoHHsHq3K3qtPZWJ.html (retrieved May 6, 2019), 8 pages.

International Searching Authority, "Written Opinion," issued in connection with International Patent Application No. PCT/CN2019/079790, dated Jan. 3, 2020, 4 pages.

International Searching Authority, "Search Report," issued in connection with International Patent Application No. PCT/CN2019/079790, dated Jan. 3, 2020, 4 pages.

European Patent Office, "Extended European Search Report," issued in connection with European Patent Application No. 20164273.3, dated Oct. 9, 2020, 14 pages.

United States Patent and Trademark Office, "Notice of Allowance," issued in connection with U.S. Appl. No. 29/673,785, dated Nov. 16, 2020, 8 pages.

European Patent Office, "Extended Search Report," issued in connection with European Patent Application No. 20181123.9, dated Dec. 4, 2020, 11 pages.

"Dell's New Latitude 7400 2-in-1 Can Detect Your Presence and Automatically Wake the System," MSPowerUser, Jan. 4, 2019, available at https://mspoweruser.com/dells-new-latitude-7400-2-in-1-can-detect-your-presence-and-automatically-wake-the-system/ (20 pages).

European Patent Office, "Extended European Search Report" issued in connection with EuropeanPatent Application No. 201994494.9, dated Feb. 17, 2021, 62 pages.

United States Patent and Trademark Office, "Non-Final Office Action," issued in connection with U.S. Appl. No. 16/586,225, dated Jun. 15, 2021, 14 pages.

European Patent Office, "Extended European Search Report," issued in connection with European Patent Application No. 20197335.1, dated Jul. 16, 2021, 11 pages.

* cited by examiner

TECHNOLOGIES FOR ADAPTIVE RENDERING USING 3D SENSORS

BACKGROUND

Mobile computing devices are quickly becoming ubiquitous tools for the average consumer. Mobile computing devices, such as smart phones, smart glasses, tablet computers, and the like, may be used for a variety of purposes including work, entertainment, and information research. As mobile computing devices become more ingrained into the everyday life of users, alternative, additional, or improved modes of interacting with the mobile computing devices are becoming ever more important.

Modern computer applications such as web browsers rely on predictive or adaptive rendering to improve response to user navigation or input. For example, an application may predict the information that a user access or see next, render it in the background, and then display it when appropriate. The ability to predictively render information provides for an improved user experience. Traditional predictive rendering uses view history and user input history to decide what to predictively render.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
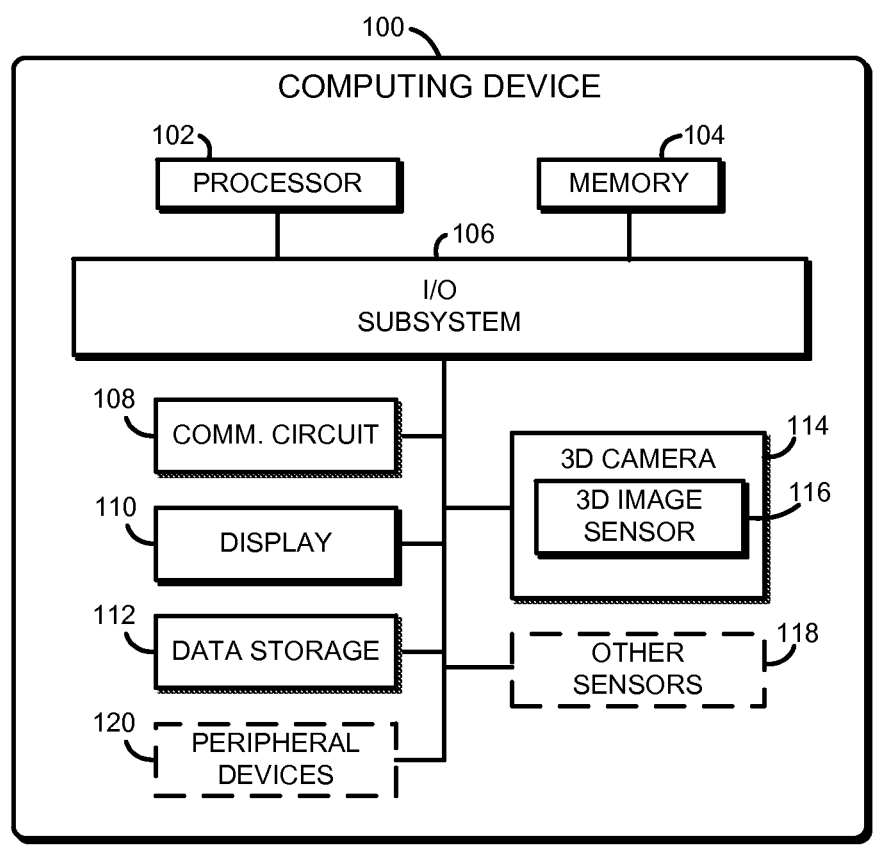
FIG. 1 is a simplified block diagram of at least one embodiment of a computing device including a 3D camera.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for adaptive rendering is shown. In use, the computing device 100 may be configured to continually or periodically capture 3D images from a 3D camera 114, which may be included in the computing device 100. As discussed in more detail below, the computing device 100 is configured to analyze the 3D images for a gesture performed by a user of the computing device 100 and assist or adapt rendering operations of an application (e.g., a web browser) executed by the computing device 100. For example, the computing device 100 may adjust or modify pre-navigation, pre-fetching, and/or other rendering operations of content to be displayed to the user (e.g., pre-fetching or pre-rendering content based on a user gesture).

The computing device 100 may be embodied as any type of computer or computing device capable of rendering content and performing the functions herein. For example, the computing device 100 may be embodied as or otherwise include, without limitation, a smartphone, a tablet computer, a laptop computer, a cellular phone, a notebook computer, a laptop computer, a wearable computer, smart eyeglasses, a smart watch, a digital camera, a head-mounted display unit, a handset, a messaging device, a multiprocessor system, a processor-based system, a consumer electronic device, and/or any other computing device capable of performing the functions herein. As shown in FIG. 1, the illustrative computing device 100 includes a processor 102, a memory 104, an I/O subsystem 106, a communication circuit 108, a display 110, data storage 112, and a 3D camera 114 including a 3D image sensor 116. In some embodiments, the computing device 100 includes other sensors 118, such as accelerometers, location sensors, or additional sensors found in computing devices.

The processor 102 may be embodied as any type of processor capable of performing the functions described herein. For example, the processor 102 may be embodied as a single or multi-core processor(s), a single or multi-socket processor, a digital signal processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the computing device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104 and other components of the computing device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the computing device 100 on a single integrated circuit chip.

The communication circuit 108 may be embodied as any communication circuit, device, or collection thereof, capable of enabling communications between the computing device 100 and other devices. To do so, the communication circuit 108 may be configured to use any one or more communication technology and associated protocols (e.g., Ethernet, Bluetooth®, Wi-Fi®, WiMAX, near field communication (NFC), etc.) to effect such communication.

The display 110 of the computing device 100 may be embodied as any type of display capable of displaying digital information such as a liquid crystal display (LCD), a light emitting diode (LED), a plasma display, a cathode ray tube (CRT), an image projector (e.g., 2D or 3D), a laser projector, a touchscreen display, and/or other type of display device.

The data storage 112 may be embodied as any type of device or devices configured for the short-term or long-term storage of data. For example, the data storage 112 may include any one or more memory devices and circuits, memory cards, hard disk drives, solid-state drives, or other data storage devices.

The 3D camera 114 may be embodied as any type of device or circuit configured to capture images or video (i.e., collections of images or frames) and capable of performing the functions described herein. As discussed above, the 3D camera 114 includes a 3D image sensor 116 configured to generate three-dimensional images (e.g., images including a depth channel or information). As such, the 3D camera 114 may be embodied as one or more cameras capable of generating or capturing three-dimensional images such as, for example, a depth camera, a bifocal camera, stereo cameras, and/or cameras otherwise capable of generating a depth image, channel, or stream. For example, in some embodiments, the 3D camera 114 may include an infrared (IR) projector and an IR sensor such that the IR sensor estimates depth values of objects in the scene by analyzing the IR light pattern projected on the scene by the IR projector. In another embodiment, the 3D camera 114 may include at least two lenses and corresponding sensors configured to capture images from at least two different viewpoints of a scene (e.g., a stereo camera). In some embodiments, the 3D camera 114 may be embodied as an INTEL REALSENSE 3D camera. Additionally, in some embodiments, the 3D camera 114 may be embodied as a 2D camera coupled with appropriate image processing to generate a depth image based on one or more 2D images.

Of course, the computing device 100 may include other or additional components, such as those commonly found in a computer (e.g., various input/output devices), in other embodiments. For example, the computing device 100 may include one or more peripheral devices 120. Such peripheral devices 120 may include any type of peripheral device commonly found in a computing device, for example, a hardware keyboard, a mouse, a touchpad, a scroll wheel, input/output devices, peripheral communication devices, and/or other peripheral devices. Additionally, in some embodiments, one or more of the illustrative components may be incorporated in, or otherwise form a portion of, another component. For example, the memory 104, or portions thereof, may be incorporated in the processor 102 in some embodiments.

Figure 2:
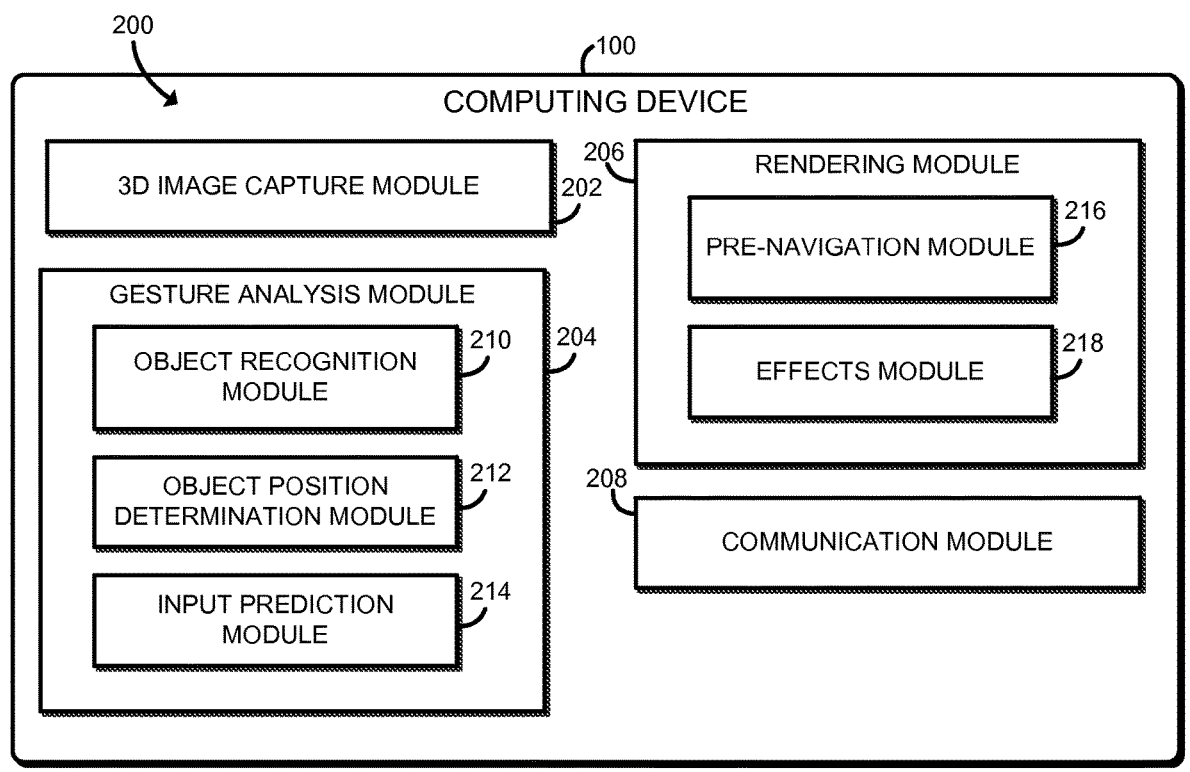
FIG. 2 is a block diagram of at least one embodiment of an environment that may be established by the computing device of FIG. 1.

Referring now to FIG. 2, in use, the computing device 100 may establish an environment 200. The illustrative environment 200 includes a 3D image capture module 202, a gesture analysis module 204, a rending module 206, and a communication module 208. The various modules of the environment 200 may be embodied as hardware, software, firmware, or a combination thereof. For example, the various modules, logic, and other components of the environment 200 may form a portion of, or otherwise be established by, the processor 102 or other hardware components of the computing device 100. As such, in some embodiments, one or more of the modules of the environment 200 may be embodied as circuitry or collection of electrical devices (e.g., a 3D image capture circuit 202, a gesture analysis circuit 204, a rendering circuit 206, etc.). It should be appreciated that, in such embodiments, one or more of the 3D image capture circuit 202, the gesture analysis circuit 204, and/or the rendering circuit 206 may form a portion of one or more of the processor 102, the memory 104, the I/O subsystem 106, the data storage 112, and/or the 3D camera 114. Additionally, in some embodiments, one or more of the illustrative modules may form a portion of another module and/or one or more of the illustrative modules may be independent of one another.

The 3D image capture module 202 is configured to capture a 3D image of a user of the computing device 100 produced from the 3D camera 114. As discussed above, the 3D images may be captured periodically or continually. In some embodiments, the 3D image capture module 202 may also capture context data associated with the captured 3D images. Such context data may provide an indication, for example, as to when the user last provided input to the computing device 100.

The gesture analysis module 204 is configured to analyze the captured 3D images for one or more gestures performed by a user. Such gestures may be embodied as any type of gesture capable of being performed by the user and detected by the computing device 100. The gestures may be embodied as static or dynamic gestures. For example, a static gesture may be defined as a particular location, orientation, or pose of the user's head, finger, or hand. A dynamic gesture may be defined as a particular motion or sequence of movements of the user's finger, head, or hand (e.g., whether the user's finger is approaching the computing device 100, whether the user's head is turned away from the computing device 100, etc.)

The illustrative gesture analysis module 204 illustratively includes an object recognition module 210 and object position determination module 212. The object recognition module 210 is configured to recognize objects in the 3D image, such as a user's head, eyes, mouth, hands, fingers, etc. To do so, the object recognition module 210 may utilize any suitable object detection or recognition technology. The object position determination module 212 is configured to determine the position (i.e., location and orientation) of some or all of the objects recognized by the object recognition module 210. For example, the object recognition module 210 may recognize a finger of the user and the object position determination module 212 may determine a location and/or orientation of the recognized finger to determine a gesture of the user based thereon. In some embodiments, the coordinates of a position of an object may be fully determined (i.e., location along three location axes such as x, y, and z and orientation about three axes such as yaw, pitch, and roll). In other embodiments, only a subset of the coordinates may be determined for an object, such as x and y. In some embodiments, the object recognition module 210 may be configured to use a software library such as the INTEL REALSENSE software development kit (SDK) in order to recognize objects and determine their positions.

The gesture analysis module 204 also includes an input prediction module 214. The input prediction module 214 is configured to use the determined position of one or more objects to predict an input from a user. For example, if a user's finger is located close to or being moved close to an input device such as a touch screen or touchpad, the input prediction module 214 may predict that the user is going to touch a certain location, or may predict that the user is going to perform a gesture on the touch screen, such as a scroll gesture. In such embodiments, the input prediction module 214 may identify the finger positioning as a pre-navigation gesture, which may be embodied as any type of gesture capable of providing an indication that the user is likely to provide a navigation input (such as clicking a link or scrolling on a web browser) to the computing device 100 in the near future.

The rendering module 206 is configured to perform rendering operations on the computing device 100. For example, the rendering module 206, or portion thereof, may be included in application, such as a web browser, that is responsible for generating a graphical representation of content to be presented to the user, such as a retrieved web page. A rendering operation may be embodied as any operation related to the rendering of the graphical representation, such as interpreting hypertext or other web code, resizing images, changing font size, retrieving data related to rendering content, or zooming in or out on a web page or text. Additionally, a rendering operation may refer to rendering all of the content to be displayed, or may refer to a rendering a portion of the content. A rendering operation may include rendering content that is to be displayed immediately, or may include rendering content not currently displayed, such as content accessible after a user scrolls on a web page. In some embodiments, the rendering module 206 may be configured to employ more than one algorithm for performing a rendering operation. For example, the computing device 100 may have a faster, but less energy efficient, processor as well as a slower, but more energy efficient, processor. The rendering module 206 may in some circumstances be configured to use the faster processor in order to perform a rendering operation faster, and may in other circumstances be configured to use the slower processor in order to perform a rendering operation using less energy. In some embodiments, there may be one processor that can operate in different configurations to fulfill the role of each of the faster processor and the slower processor. The rendering module 206 may also pause or start a certain rendering operation if that is determined to be desired.

Illustratively, the rendering module 206 includes a pre-navigation module 216 and an effects module 218. The pre-navigation module 216 is configured to retrieve data related to content that a user has not yet accessed. For example, the input prediction module 214 may recognize a pre-navigation gesture and predict that the user is going to click a certain link. In response, the pre-navigation module 216 may retrieve the data related to the link before the user has clicked on the link.

The effects module 218 is configured to perform a selective rendering operation based on a rendering gesture performed by the user. For example, the effects module 218 may zoom in or out on a certain portion of the content presented to the user, such as zooming in on a portion of a web page. In some embodiments, the zooming may include resizing text or changing the size of the rendered content. Unless otherwise specified, zooming may include zooming in or zooming out. Additionally, the effects module 218 may perform other content alteration actions such as translating or shifting the content of the web page based on the positioning (e.g., rotation) of the user's head or other gesture.

The communication module 208 is configured to facilitate communications of the computing device 100 with other computing devices. For example, the pre-navigation module 216 may communicate with a server computer in order to pre-fetch the data. The communication module 208 may communicate with such server computing or other computers either directly or indirectly through Ethernet, Bluetooth®, Wi-Fi®, WiMAX, near field communication (NFC), etc.

Figure 3:
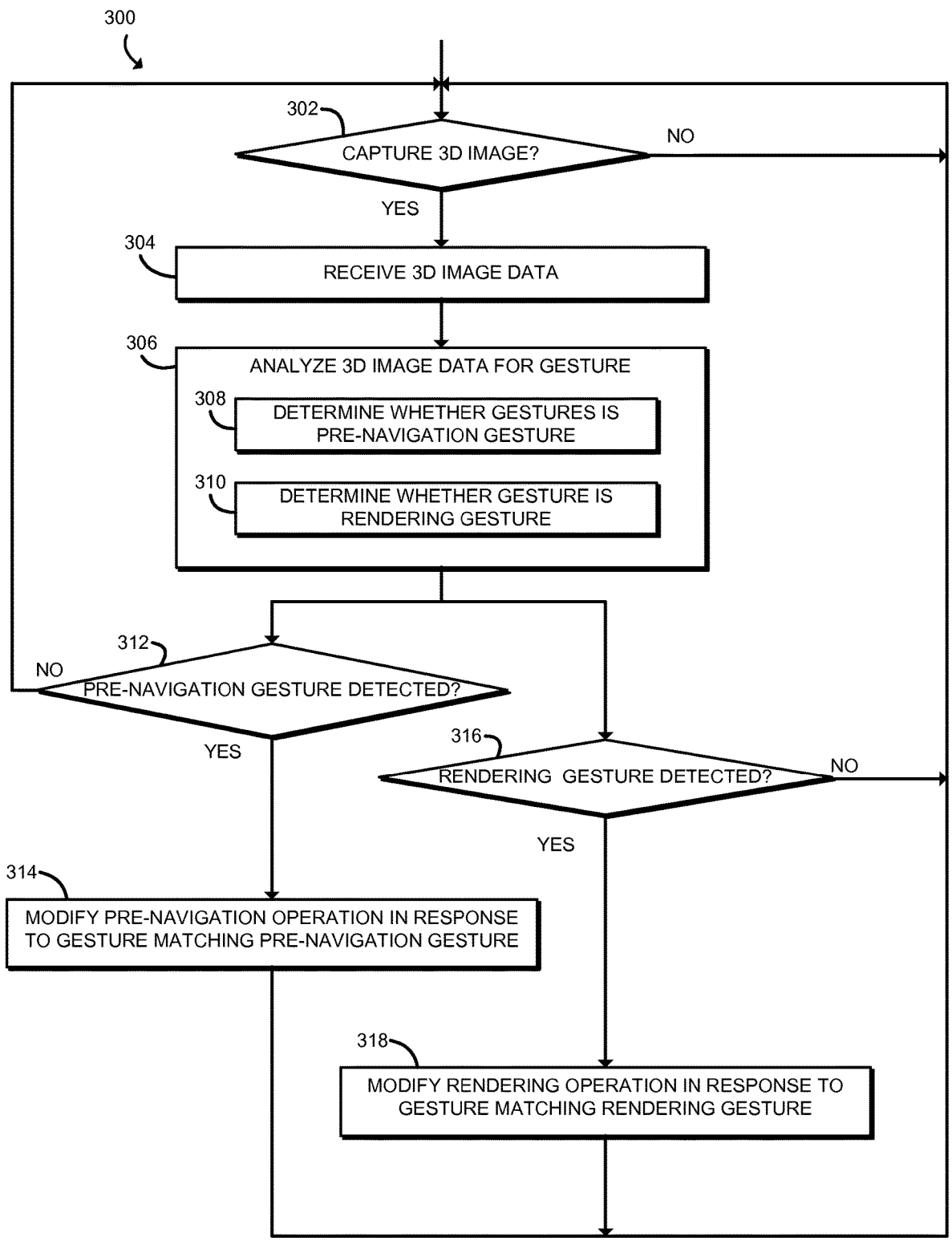
FIG. 3 is a simplified flow diagram of at least one embodiment of a method for adaptive rendering based on one or more 3D images of a user of the computing device of FIG. 1 that may be executed by the computing device of FIG. 1.

Referring now to FIG. 3, in use, the computing device 100 may execute a method 300 for adaptive rendering. The method 300 begins with block 302, in which the computing device determines whether a 3D image is to be captured. As discussed above, the computing device 100 may be configured to capture 3D images with the 3D camera continually or periodically, or may capture images depending on the context of the user, of the computing device 100, or of one or more applications of the computing device 100.

If the computing device 100 captures a 3D image, the method proceeds to block 304, wherein the 3D image data is received. The 3D image may be embodied as a single 3D image or a set of 3D images. In block 306, the computing device 100 analyzes the 3D image for a gesture. For example, the computing device 100 may analyze the 3D image for one or more objects (e.g., the user's finger, head, or hand), and may determine the position of at least some of the objects. As described above, the computing device 100 may use a software library such as the INTEL REALSENSE SDK to determine the identity of the objects and the related object positions. As discussed above, the gesture determined in block 306 may be a static gesture such as a finger location, head location, or head orientation of the user, or may be a dynamic gesture such as a finger or head movement.

As discussed below, the computing device 100 is configured to perform one or more operations dependent upon the type of gesture of the user detected in the captured 3D image(s). As such, in block 308, the gesture analysis module 204 determines whether the detected gesture is a pre-navigation gesture. As discussed above, a pre-navigation gesture may be embodied as any gesture that provides an indication that the user is likely to provide a navigation input such as clicking on a link or scrolling a web page. For example, in the illustrative embodiment, one such pre-navigation gesture is a movement gesture of user's finger toward the computing device 100 (i.e., the user is likely to select a link or provide other input). Additionally, in block 310, the gesture analysis module 204 determines whether the detected gesture is a rendering gesture. As discussed above, a rendering gesture may be embodied as any gesture capable of being interpreted by the computing device 100 as a command to change a rendering operation (i.e., either intentionally or unintentionally by the user). For example, as discussed in more detail below, the computing device 100 may be configured to perform a more efficient rendering procedure in response to the user's gaze being oriented in a direction other than the display 110 of the computing device 100. The computing device 100 may also be configured to perform a content alteration action on the display content. For example, the computing device 100 may zoom on a web page based on the location of the user's head (e.g., if the user brings his head closer, the computing device 100 may zoom in on a portion of the content currently displayed) or translate the web page based on the rotation of the user's head. In those examples, the orientation of the user's gaze and the location of the user's head may be interpreted as rendering gestures.

After the computing device 100 has interpreted the 3D image data, the method 300 advances to block 312 and 316. In block 312, the computing device 100 determines whether a pre-navigation gesture has been detected. If so, the method 300 advances to block 314 in which the computing device 100 modifies, adjusts, or implements one or more pre-navigation operations in response to the pre-navigation gesture. For example, in some embodiments, the computing device 100 may have one or more pre-navigation operations already being performed or queued to be performed, and the set of pre-navigation operations may be modified by adding or removing pre-navigation operations. For example, the computing device 100 may be configured to pre-fetch content pointed to by various links included in content displayed to the user. However, rather than pre-fetching content from every link, the computing device 100 may select a sub-set of links to pre-fetch content from based on the pre-navigation gesture (e.g., based on which like the user appears to be in the process of selecting) and/or stop the pre-fetching of content from links the user is likely not to click based on the pre-navigation gesture. In addition to pre-fetching data, a pre-navigation operation may include rendering content not currently displayed, such as content viewable to the user by scrolling. For example, the computing device 100 may pre-render content likely to be scrolled to by the user based on the pre-navigation gesture.

Referring back to block 316, the computing device 100 determines whether a rendering gesture has been detected. If so, the method 300 proceeds to block 318 in which the computing device 100 modifies, adjusts, or initiates a rendering operation in response to the rendering gesture. For example, the rendering gesture may be embodied as an indication that the distance from the user's head to the display 110 is less or greater than a reference threshold. In response to such a rendering gesture, the computing device 100 may modify a rendering operation by zooming on a portion of the displayed content, translating or shifting the web page, or performing some other rendering operation. As another example, the rendering gesture may be embodied as an indication that the orientation of the user's gaze is away from the display 110 of the computing device 100. In response to such a rendering gesture, the computing device 100 may determine that the user's attention is not directed to the content, and therefore may modify a rendering operation by employing a rendering algorithm that uses less energy. For example, the rendering algorithm may use a lower-power processor, may pause the rendering, or may pause a portion of the rendering.

If the detected gesture does not match either a known pre-navigation gesture or a rendering gesture, the method 300 loops back to block 302 in which the computing device 100 determines whether to capture additional 3D images. In this way, the computing device 100 is configured to adaptively render content to a user in a manner that may reduce the power consumption of the computing device 100 and/or improve responsive of the computing device 100 to user requests.

EXAMPLES

Illustrative examples of the devices, systems, and methods disclosed herein are provided below. An embodiment of the devices, systems, and methods may include any one or more, and any combination of, the examples described below.

Example 1 includes a computing device for a assisting rendering of content in a web browser, the computing device comprising a 3D camera to capture a 3D image of a user of the computing device; gesture analysis module to detect a gesture performed by the user in the 3D image and to determine at least one of (i) whether the gesture is a pre-navigation gesture or (ii) whether the gesture is a rendering gesture; and a rendering module to modify at least one of (i) a pre-navigation operation of a web browser in response to a determination that the gesture is the pre-navigation gesture or (ii) a rendering operation of the web browser in response to a determination that the gesture is the rendering gesture.

Example 2 includes the subject matter of Example 1, and wherein the gesture analysis module is to determine whether the gesture is a pre-navigation gesture and wherein to determine whether the gesture is the pre-navigation gesture comprises to (i) detect a location of a finger of the user based on the 3D image and (ii) determine a predicted input based on the location of the finger.

Example 3 includes the subject matter of any of Examples 1 and 2, and wherein to determine the predicted input based on the location of the finger comprises to (i) track the finger and (ii) determine a link of the web browser the user is likely to select based on the tracking of the finger.

Example 4 includes the subject matter of any of Examples 1-3, and wherein to modify the pre-navigation operation of the web browser comprises to add an additional pre-navigation operation to an existing set of pre-navigation operations, wherein the additional pre-navigation operation comprises fetching data associated with the link of the web browser.

Example 5 includes the subject matter of any of Examples 1-4, and wherein to determine the predicted input based on the location of the finger comprises to (i) track a motion of the finger and (ii) determine a scrolling input the user is likely to perform based on the motion of the finger.

Example 6 includes the subject matter of any of Examples 1-5, and wherein to modify the pre-navigation operation of the web browser comprises to add an additional pre-navigation operation to an existing set of pre-navigation operations, wherein the additional pre-navigation operation comprises pre-rendering of content.

Example 7 includes the subject matter of any of Examples 1-6, and wherein the gesture analysis module is to determine whether the gesture is a rendering gesture and wherein to determine whether the gesture is the rendering gesture comprises to (i) determine a distance from the computing device to a head of the user and (ii) determine that the distance is past a threshold.

Example 8 includes the subject matter of any of Examples 1-7, and, wherein the rendering operation comprises a zooming operation of content of a web page of the web browser.

Example 9 includes the subject matter of any of Examples 1-8, and wherein to determine whether the gesture is the rendering gesture comprises to (i) determine an orientation of a gaze of the user and (ii) determine that the gaze is not oriented to the computing device.

Example 10 includes the subject matter of any of Examples 1-9, and wherein the modified rendering operation uses less power than a previous rendering operation.

Example 11 includes a method for a assisting rendering of content in a web browser displayed on a computing device, the method comprising capturing, by a 3D camera of the computing device, a 3D image of a user of the computing device; detecting, by the computing device, a gesture performed by the user in the 3D image; determining, by the computing device, at least one of (i) whether the gesture is a pre-navigation gesture or (ii) whether the gesture is a rendering gesture; and modifying at least one of (i) a pre-navigation operation of the web browser in response to a determination that the gesture is the pre-navigation gesture or (ii) a rendering operation of the web browser in response to a determination that the gesture is the rendering gesture.

Example 12 includes the subject matter of Example 11, and further including determining, by the computing device, that the gesture is the pre-navigation gesture.

Example 13 includes the subject matter of any of Examples 11 and 12, and wherein determining, by the computing device, that the gesture is the pre-navigation gesture comprises (i) detecting a location of a finger of the user based on the 3D image and (ii) determining, by the computing device, a predicted input based on the location of the finger.

Example 14 includes the subject matter of any of Examples 11-13, and wherein determining, by the computing device, the predicted input based on the location of the finger comprises (i) tracking the finger and (ii) determining a link of the web browser the user is likely to select based on the tracking of the finger.

Example 15 includes the subject matter of any of Examples 11-14, and wherein modifying the pre-navigation operation of the web browser comprises adding an additional pre-navigation operation to an existing set of pre-navigation operations, wherein the additional pre-navigation operation comprises fetching data associated with the link of the web browser.

Example 16 includes the subject matter of any of Examples 11-15, and wherein determining, by the computing device, the predicted input based on the location of the finger comprises (i) tracking the finger and (ii) determining a scrolling input the user is likely to perform based on the tracking of the finger.

Example 17 includes the subject matter of any of Examples 11-16, and wherein modifying the pre-navigation operation of the web browser comprises adding an additional pre-navigation operation to an existing set of pre-navigation operations, wherein the additional pre-navigation operation comprises pre-rendering.

Example 18 includes the subject matter of any of Examples 11-17, and further including determining, by the computing device, that the gesture is the rendering gesture.

Example 19 includes the subject matter of any of Examples 11-18, and wherein determining, by the computing device, that the gesture is the rendering gesture comprises (i) determining, by the computing device, a distance from the computing device to a head of the user and (ii) determining, by the computing device, that the distance is past a threshold.

Example 20 includes the subject matter of any of Examples 11-19, and wherein the rendering operation comprises zooming on a web page of the web browser.

Example 21 includes the subject matter of any of Examples 11-20, and wherein determining, by the computing device, that the gesture is the rendering gesture comprises (i) determining, by the computing device, an orientation of a gaze of the user and (ii) determining, by the computing device, that the gaze is not oriented to the computing device.

Example 22 includes the subject matter of any of Examples 11-21, and wherein the modified rendering operation uses less power than a previous rendering operation.

Example 23 includes one or more machine-readable storage media comprising a plurality of instructions stored thereon that in response to being executed result in a computing device performing the method of any of Examples 11-22.

Example 24 includes a computing device for a assisting rendering of content in a web browser, the computing device comprising means for capturing a 3D image of a user of the computing device; means for detecting a gesture performed by the user in the 3D image; means for determining at least one of (i) whether the gesture is a pre-navigation gesture or (ii) whether the gesture is a rendering gesture; and means for modifying at least one of (i) a pre-navigation operation of the web browser in response to a determination that the gesture is the pre-navigation gesture or (ii) a rendering operation of the web browser in response to a determination that the gesture is the rendering gesture.

Example 25 includes the subject matter of Example 24, and further including means for determining that the gesture is the pre-navigation gesture.

Example 26 includes the subject matter of any of Examples 24 and 25, and wherein the means for determining that the gesture is the pre-navigation gesture comprises (i) means for detecting a location of a finger of the user based on the 3D image and (ii) means for determining, by the computing device, a predicted input based on the location of the finger.

Example 27 includes the subject matter of any of Examples 24-26, and wherein the means for determining the predicted input based on the location of the finger comprises (i) means for tracking the finger and (ii) means for determining a link of the web browser the user is likely to select based on the tracking of the finger.

Example 28 includes the subject matter of any of Examples 24-27, and wherein the means for modifying the pre-navigation operation of the web browser comprises means for adding an additional pre-navigation operation to an existing set of pre-navigation operations, wherein the additional pre-navigation operation comprises fetching data associated with the link of the web browser.

Example 29 includes the subject matter of any of Examples 24-28, and wherein the means for determining, by the computing device, the predicted input based on the location of the finger comprises (i) means for tracking the finger and (ii) means for determining a scrolling input the user is likely to perform based on the tracking of the finger.

Example 30 includes the subject matter of any of Examples 24-29, and wherein means for modifying the pre-navigation operation of the web browser comprises means for adding an additional pre-navigation operation to an existing set of pre-navigation operations, wherein the additional pre-navigation operation comprises pre-rendering.

Example 31 includes the subject matter of any of Examples 24-30, and further including means for determining that the gesture is the rendering gesture.

Example 32 includes the subject matter of any of Examples 24-31, and wherein the means for determining that the gesture is the rendering gesture comprises (i) means for determining, by the computing device, a distance from the computing device to a head of the user and (ii) means for determining, by the computing device, that the distance is past a threshold.

Example 33 includes the subject matter of any of Examples 24-32, and wherein the means for rendering operation comprises means for zooming on a web page of the web browser.

Example 34 includes the subject matter of any of Examples 24-33, and wherein means for determining that the gesture is the rendering gesture comprises (i) means for determining an orientation of a gaze of the user and (ii) means for determining that the gaze is not oriented to the computing device.

Example 35 includes the subject matter of any of Examples 24-34, and wherein the modified rendering operation uses less power than a previous rendering operation.

The invention claimed is:

1. A computing device for assisting rendering of content in a web browser, the computing device comprising:
    a 3D camera to capture one or more 3D images of a user of the computing device;
    at least one memory;
    instructions; and
    at least one processor to execute the instructions to:
        track, based on the one or more 3D images, a motion of a finger of the user while the finger is not in contact with the computing device;
        determine, based on the motion of the finger while the finger is not in contact with the computing device, a navigation input the user is likely to perform, wherein the navigation input includes at least one of a scrolling input or a click input, wherein the scrolling input corresponds to a first motion of the finger while the finger is in contact with the computing device and the click input corresponds to a second motion of the finger while the finger is in contact with the computing device;
        in response to determination of the navigation input the user is likely to perform, modify a queue of operations based on the determination of the navigation input the user is likely to perform, wherein the queue is populated with operations prior to the determination of the navigation input the user is likely to perform, and modification of the queue of operations includes removing ones of the operations from the queue;
        cause pre-rendering of content for the web browser based on the modified queue of operations, wherein pre-rendering of content includes interpreting web code;
        detect, after the pre-rendering of the content, the at least one of the scrolling input or the click input; and
        cause a display of the content in the web browser in response to the detection of the at least one of the scrolling input or the click input.

2. The computing device of claim 1, wherein the at least one processor is to execute the instructions to:
    determine a distance from the computing device to a head of the user;
    determine that the distance is past a threshold; and
    perform a zooming operation in response to the distance from the computing device to the head of the user passing the threshold.

3. The computing device of claim 1, wherein the at least one processor is to execute the instructions to:
    determine an orientation of a gaze of the user;
    determine that the gaze is not oriented to the computing device; and
    in response to the determination that the gaze is not oriented to the computing device, modify an efficiency of a rendering process, the at least one processor to modify the efficiency of the rendering process by changing a configuration of the at least one processor of the computing device.

4. At least one machine-readable storage device comprising instructions stored thereon that, when executed, cause a computing device to:
    capture, by a 3D camera of the computing device, one or more 3D images of a user of the computing device;
    track, based on the one or more 3D images, a motion of a finger of the user while the finger is not in contact with the computing device;
    determine, based on the motion of the finger while the finger is not in contact with the computing device, a navigation input the user is likely to perform, wherein the navigation input includes at least one of a scrolling input or a click input, wherein the scrolling input corresponds to a first motion of the finger while the finger is in contact with the computing device and the click input corresponds to a second motion of the finger while the finger is in contact with the computing device;
    in response to determination of the navigation input the user is likely to perform, modify a queue of operations based on the determination of the navigation input the user is likely to perform, wherein the queue is populated with operations prior to the determination of the navigation input the user is likely to perform, and modification of the queue of operations includes removing ones of the operations from the queue;
    cause pre-rendering of content for a web browser based on the modified queue of operations, wherein pre-rendering of content includes interpreting web code;
    detect, after the pre-rendering of the content, the at least one of the scrolling input or the click input; and
    cause a display of the content in the web browser in response to the detection of the at least one of the scrolling input or the click input.

5. The at least one machine-readable storage device of claim 4, wherein the instructions cause the computing device to:
    determine a distance from the computing device to a head of the user;
    determine that the distance is past a threshold; and
    perform a zooming operation in response to the distance from the computing device to the head of the user passing the threshold, wherein the zooming operation includes zooming on a web page of the web browser.

6. The at least one machine-readable storage device of claim 5, wherein the instructions cause the computing device to:
- determine an orientation of a gaze of the user;
- determine that the gaze is not oriented to the computing device; and
- in response to the determination that the gaze is not oriented to the computing device, modify an efficiency of a rendering process, wherein to modify the efficiency of the rendering process includes changing a configuration of one or more processors of the computing device.

7. A method for assisting rendering of content in a web browser displayed on a computing device, the method comprising:
- capturing, by a 3D camera of the computing device, one or more 3D images of a user of the computing device;
- tracking, by the computing device and based on the one or more 3D images, a motion of a finger of the user while the finger is not in contact with the computing device;
- determining, by the computing device and based on the motion of the finger while the finger is not in contact with the computing device, a navigation input the user is likely to perform, wherein the navigation input includes at least one of a scrolling input or a click input, wherein the scrolling input corresponds to a first motion of the finger while the finger is in contact with the computing device and the click input corresponds to a second motion of the finger while the finger is in contact with the computing device;
- in response to determination of the navigation input the user is likely to perform, modifying, by the computing device, a queue of operations based on the determination of the navigation input the user is likely to perform, wherein the queue is populated with operations prior to the determination of the navigation input the user is likely to perform, and modification of the queue of operations includes removing ones of the operations from the queue;
- causing, by the computing device, pre-rendering of content for the web browser based on the modified queue of operations, wherein pre-rendering of content includes interpreting web code;
- detecting, by the computing device and after the pre-rendering of the content, the at least one of the scrolling input or the click input; and
- causing, by the computing device, a display of the content in the web browser in response to the detection of the at least one of the scrolling input or the click input.

8. The method of claim 7, further including:
- determining, by the computing device, a distance from the computing device to a head of the user;
- determining, by the computing device, that the distance is past a threshold; and
- performing, by the computing device, a zooming operation in response to the distance from the computing device to the head of the user passing the threshold.

9. The method of claim 8, further including:
- determining, by the computing device, an orientation of a gaze of the user;
- determining, by the computing device, that the gaze is not oriented to the computing device; and
- in response to the determination that the gaze is not oriented to the computing device, modifying, by the computing device, an efficiency of a rendering process, wherein to modify the efficiency of the rendering process includes changing a configuration of one or more processors of the computing device.

* * * * *